UNITED STATES PATENT OFFICE.

WILLIAM J. MELHUISH, OF UPPER PARKSTONE, BOROUGH OF POOLE, ENGLAND.

MILK-LIKE FOOD FOR THE FEEDING OF AGRICULTURAL STOCK.

1,265,227.      Specification of Letters Patent.      Patented May 7, 1918.

No Drawing.      Application filed April 23, 1917. Serial No. 164,033.

*To all whom it may concern:*

Be it known that I, WILLIAM JAMES MELHUISH, of Highwood House, Upper Parkstone, within the borough of Poole and the county of Dorset, England, British subject, lecturer in dietetics, have invented a new and useful Milk-like Food for the Feeding of Agricultural Stock, of which the following is a specification.

This invention is a modification of the invention described in my United States Patent specification No. 1210667, and is designed to provide an exceptionally cheap and efficient milk-like food for agricultural live stock feeding purposes.

Everyone recognizes the value of milk as a stock food, but the difficulty of providing milk is ever present. This difficulty is not likely to diminish in the future: hence the present invention.

It will be best to describe the invention by taking an actual working example and explaining the various points as they arise.

As the milk is designed to be made on farms and other places more or less remote from town facilities, the conditions have been made as primitive as possible.

I require two pans only for the purpose. These must be double (or jacketed) pans, and for use over a gas ring, oil stove or ordinary fire, such double saucepans can be purchased at from £1 to £5 each, ranging from four to twelve gallons, and depending on whether they are made in tinned copper or iron plate. Of course if steam is available stronger pans would be necessary and the fitting a matter of engineering.

I will assume that I want to make 10 gallons at a time, and as it is usual to feed stock twice a day—morning and evening, I shall want two outputs of 10 gallons. For this I require one 12 gallon pan and one holding the finished quantity of 10 gallons. Both pans need well fitting lids which will not turn easily. Through the lid of the larger pan I pass a stirring gear, which in such a small pan, can be made to work easily by hand. The stirring gear must provide for a vigorous agitation of the liquor, and many forms will suggest themselves.

To make ten gallons of food I shall want 16 lbs. of pea nuts, or an equivalent quantity of any other similar starchless legume, which contains an oil of an edible character. It is improbable, however, that a better nut than the pea nut can be found for the purpose. It grows over a wide area, is cheap to produce and purchase, and is unfailingly popular as a food wherever it is known. These nuts can be used either blanched, in which case the milk will be white in color, or with the pellicle unremoved, when the finished milk will be dark or pink. The nuts can be readily obtained either way, the pellicle making a very excellent feeding bran. They can be easily blanched by warming up and then rubbing over a coarse wire sieve. If the nuts are washed well in hot soda water before use, much of their nutty flavor will disappear: if they are used unwashed the milk will have a nutty flavor. This is not at all unpleasant, and is often, indeed, preferred. They can be ground up in the wet state with care.

The 16 lbs. nut are to be ground up coarsely and for the purpose a household mincing machine fitted with a large funnel top for convenience of feeding, will answer admirably. The meal produced is the source of the casein, albumen, fat and some of the salts necessary to make the food complete.

Into the 12 gallon pan I now place eight gallons of water, and filling the outer jacket to the correct level I bring this eight gallons to the boil, for purification purposes. At no stage in the actual milk-making is the water anything near boiling point, and this point must be emphasized. When the eight gallons boil I pour in 2 gallons of lime water, made by allowing four ounces of lime to stand in two gallons of plain water over night, and then siphoning off the clear liquor when wanted. As soon as the lime water is in, the whole of the water will be at the temperature we want for working, and the source of heat is turned off. As quickly as possible I add 160 grains of either potassium or sodium phosphate, and then empty the meal in, well stirring to insure an equal mixing. I next add about 100 grains of calcium chlorid and then the sugar. I prefer the water-white syrup known as malted dextrin, but other sweetening agents may be used. The quantity required is 5 lbs. which allowing for the moisture gives a four per cent. sugar content in the finished milk. After the sugar is in I add about 200 grains of sodium bicarbonate, 250 grains of magnesia carbonate and about 100 minims of 50 per cent. butyric acid. Then I place the lid with the stirrer in position and vigorously agitate the mass for not less than 20 minutes.

The next stage is the straining out of the insoluble meal and this is effected by pouring the whole mass into a cloth and by a gentle movement to and fro working the milk through into the second (or ten gallon) pan. The meal forms into a convenient roll, and if completely dried out it will be found that about two-thirds of the original weight has gone into solution in the milk. In its moist state it makes a very excellent food for animals, apart from the milk. I now add 20 grains of ammonium carbonate, stir the whole for a few minutes, then when down to about blood heat I carefully add a small quantity of citric acid—say about 120 grains—again stirring well, and the milk is ready for feeding. If it is inconvenient to make the milk for the early morning meal—and in most cases it means getting up at 4 a. m. then a second batch can be made the same evening and being heated up to about 160 degrees F. with the water in the jacket quite hot too and the lid firmly on the milk can be stored in a hay box or other simple thermostatic contrivance and will be found warm enough for the morning feed. I assume I have to get the evening meal ready by 4 p. m. and having got that away I start on the second lot for the 4 a. m. meal. The whole process of making one feed takes under the hour. By commencing at 3 o'clock I can be well finished with the two lots and cleared up by 5.

The milk made as above will be a fluid of about the consistency of ordinary milk. But as the animals get older they want more solid material, so I remove more or less of the insoluble meal, and later do not strain it at all. When I want to make a "milk mash" such as this I grind the meal much finer, so as to get a better mixed food. The strained milk should have a total solid content of from 11.50 to 12.50 per cent. With part of the meal in it may well rise to from 14.00 to 15.00 per cent., while with the whole meal in the mass one can get from 18.00 to 19.00 per cent. (allowing for the natural moisture in the sugar and the nuts).

When taking out for the morning meal a good stirring is advisable. It is not recommended to keep the milk longer than from the evening to the morning, and thus a Sunday turn is unavoidable.

It will be obvious that larger or smaller batches can be made, the proportions of the ingredients varying accordingly. It will be seen from the example that I use 16 per cent. by weight of the nut meal (16 lbs.) and five per cent. of the sugar (5 lbs.)—10 gallons being about 100 lbs. weight of finished milk. But by adjusting the proportions of the ingredients I build up a milk to suit the need of any animal; for instance by increasing the proteid content I make a milk suitable for puppies: by decreasing the proteid and fat and increasing the sugar I get a milk suitable for colts, and so through the whole range of mammalian milk. The more vigorous the stirring the better the content will be: but twenty minutes has been found in practice to be quite long enough. Time is an essential in this matter as the stirring: every part of the solids must be well in contact with the water to get efficient results.

The salts may be modified to meet local conditions: sodium chlorid can be added if thought fit, one of the citrates such as postass., sodium, calcium, can be used instead of citric acid, and the sugars should not be over sweet in character, else the 4 per cent. necessary will make the finished food too sweet in taste.

It will be observed that this milk is not cultured with lactic bacteria, and the reason is that when milk is fed naturally from the body of the mother direct into the mouth of the young, no lactic bacteria are present. I desire to imitate natural conditions. For the same good reason the milk is never boiled: to do so would be to destroy the vitality of the fluid and remove it from the "perfect food" class.

As a part proprietor of Gossel's Patent 27,860/1912 and at the commencement of its working in England the chief chemist engaged on same, I am well aware of its claims to use a mixture of seeds, but the specification deals only with soy beans in the working details, no provision being made for the higher edible oil content of some of the seeds specified as possible ingredients. In working on this patent I found the process so inadequate that I had to take out fresh patents, and I refer to Melhuish's No. 24,572/1913 which is the British Patent in the series. This deals alone with soy bean milk, and the working is of necessity somewhat complicated, the need for extensive machinery and power essential, and the whole process is quite impossible for farm use where the most primitive and simple methods are requisite. Gossel's Patent No. 8027/1914 is an extension of his No. 27,860/1912 and gives machinery details for the conduct of the operations, and the same complications would preclude its use on farms. I now refer to Li's specification No. 30,275/1910 which deals with soy beans alone. It does not claim pea nuts or any starchless legume other than the soy, and the plant described for the production of the milk, comparatively simple though it is, would be difficult, if not impossible, to work on farms. It is to be remembered that the conditions under which the milk is made for feeding stock generally preclude the use of power, and in my experience of the average county farm and the conditions of labor, nothing but the most elementary principles of heating water and stirring are really practical. Furthermore, the use of soy beans does not appear to have been successful as a cattle food in Gt. Britain, and I should prefer either not to use them at all or to limit them to a mixture not exceeding one third of the weight of pea nuts. This is the utmost I should prescribe.

I believe that this present invention is the first attempt to bring synthetic milk into practical use as a farm product for feeding stock, and I claim that no such simple process has ever been contemplated before.

I claim:

1. A milk-like food for agricultural live stock made from any starchless legume with an oil having an iodin value not exceeding 120 such legume being ground coarsely, stirred in hot water to extract the soluble proteins and fats, and made to imitate the content of natural milk by the addition of such salts as are usually found in milk, a not-too-sweet form of sugar to yield the carbo-hydrates, butyric and citric acids, straining out the insoluble meal, thus yielding a fluid of the consistency and food value of mammalian milk.

2. A mash or gruel-like food made from any starchless legume with an oil having an iodin value not exceeding 120 such legume being ground finely, stirred in hot water to extract the soluble proteins and fats, and made like natural milk in content by the addition of such salts, as are usually found in milk, carbo-hydrates and acids, leaving the whole or a part of the insoluble meal in the food, thus making a more or less thick gruel-like mash.

Dated this 19th day of February, 1917.

W. J. MELHUISH.

Witnesses:
P. W. SLINGSBY,
M. L. NAISH.